United States Patent [19]

Hattass et al.

[11] Patent Number: 5,244,068
[45] Date of Patent: Sep. 14, 1993

[54] DEVICE FOR LIMITING THE NUMBER OF REVOLUTIONS OF A SHAFT OF A ROTARY DRIVE FOR A SLIDING ROOF OF AN AUTOMOBILE

[75] Inventors: Rainer Hattass, Gündau; Karl Schmidhuber, Alzenau; Brigitte Weidmann, Frankfurt am Main, all of Fed. Rep. of Germany

[73] Assignee: Rockwell - Golde GmbH, Fed. Rep. of Germany

[21] Appl. No.: 738,761

[22] Filed: Aug. 1, 1991

[30] Foreign Application Priority Data

Aug. 24, 1990 [DE] Fed. Rep. of Germany ....... 4026754

[51] Int. Cl.$^5$ .............................................. B60J 7/057
[52] U.S. Cl. .................................. 192/139; 475/162; 296/223
[58] Field of Search ........................... 192/7, 138, 139; 74/526, 545; 475/162; 296/223

[56] References Cited

U.S. PATENT DOCUMENTS

| | | | |
|---|---|---|---|
| 2,991,662 | 7/1961 | Werner | 475/162 X |
| 3,763,710 | 10/1973 | Kouth et al. | 296/223 X |
| 3,948,119 | 4/1976 | Schlapp | 475/162 |
| 4,466,658 | 8/1984 | Fürst et al. | 475/162 X |
| 4,651,594 | 3/1987 | Vogel et al. | 296/223 X |
| 4,659,140 | 4/1987 | Fuerst et al. | 296/223 |
| 4,841,812 | 6/1989 | Fuerst et al. | 296/223 X |
| 4,928,547 | 5/1990 | Huyer | 74/545 |

Primary Examiner—Richard Lorence

[57] ABSTRACT

A device for limiting the number of revolutions of a shaft for a rotary drive for a sliding-lifting roof of an automobile is proposed. By the cooperation of a detent bolt, actuated by an actuating knob with a spring-loaded blocking pin and with a rotationally driven blocking ring, the shaft is blocked in rotation not only in the lid closure position, but also by a special construction of the blocking ring, in intermediate sliding and/or lifting positions of the sliding lid.

1 Claim, 4 Drawing Sheets

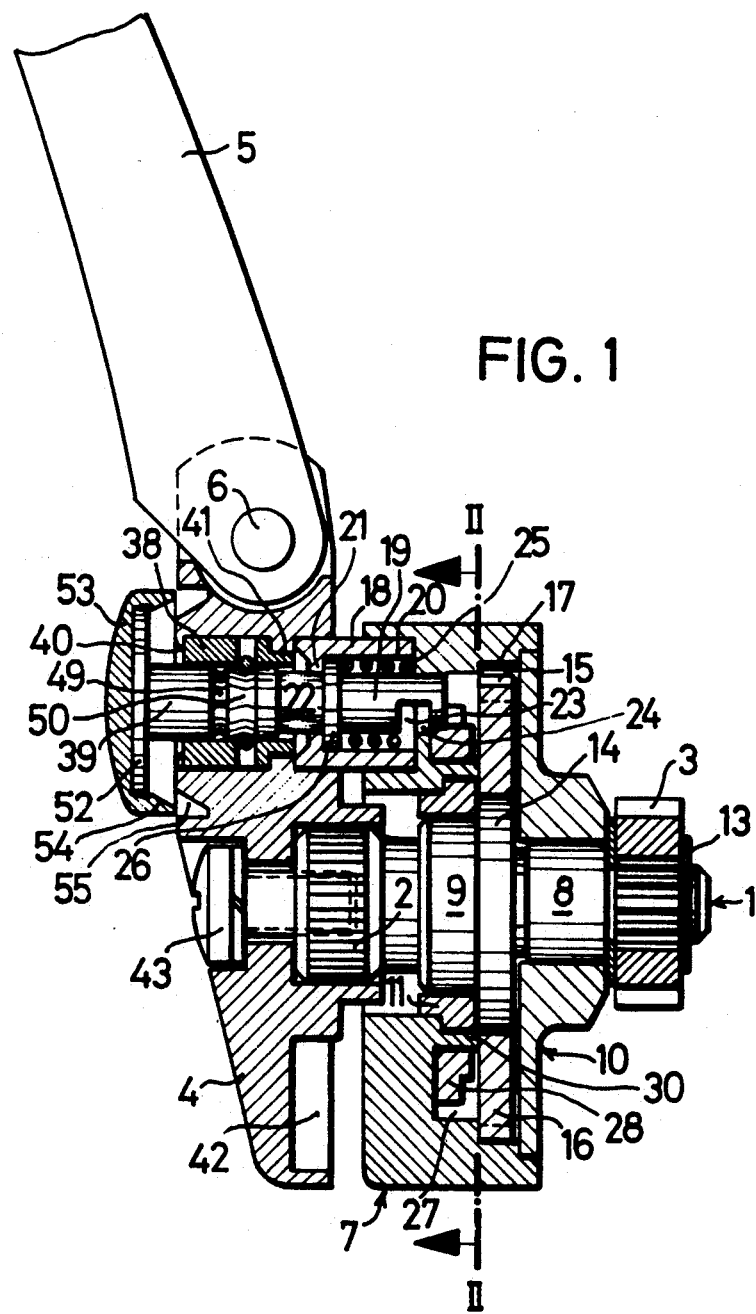

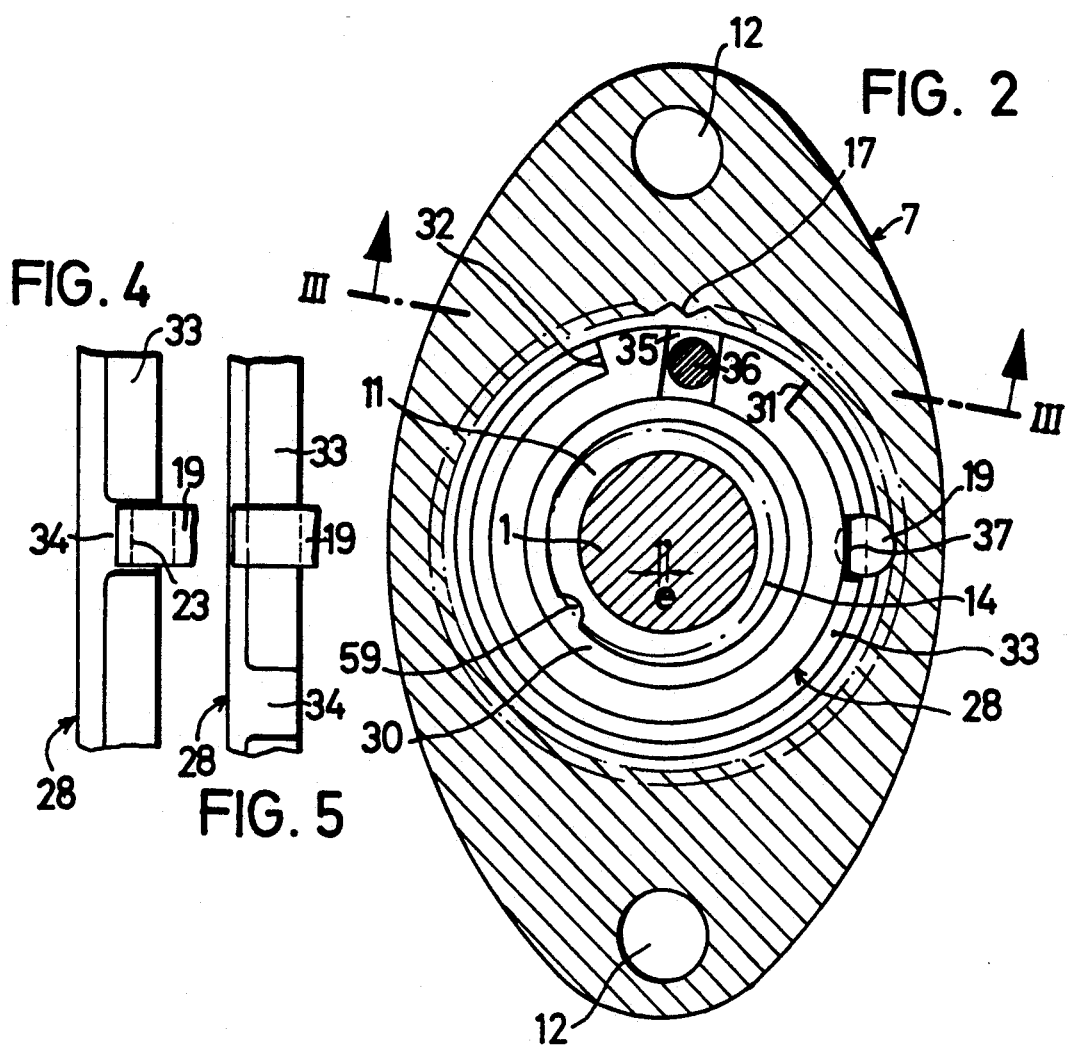

5,244,068

DEVICE FOR LIMITING THE NUMBER OF REVOLUTIONS OF A SHAFT OF A ROTARY DRIVE FOR A SLIDING ROOF OF AN AUTOMOBILE

BACKGROUND OF THE INVENTION

This invention relates to a device for limiting the number of revolutions of a shaft of a rotary drive for a sliding roof of an automobile.

A device of type is known from DE 23 33 666 C3, which comprises an eccentric disc secured to the shaft and having an externally toothed ring rotatably journalled upon its circumferential surface, the ring being surrounded by an internal set of teeth fixed in a rose and concentrically to the shaft axis, the tooth root radius (dedendum radius) of which external teeth is greater than the tooth crest radius (addendum radius) of the toothed ring approximately by the amount of the eccentricity of the eccentric disc, wherein abutment means for the limiting position of the shaft after predetermined numbers of revolutions have been reached are connected on the one hand to the toothed ring and on the other hand to the rose, wherein the abutment means connected to the rose is a blocking pin slidably guided parallel to the shaft, the pin being capable of engaging into or disengaging from the path of the abutment means connected to the toothed ring only in one specific setting of the toothed ring, whereby said pin permits both directions of rotation when engaged and, in its disengaged position, the drive is blocked in both directions of rotation, and wherein the abutment means connected to the toothed ring are formed as peripheral steps of a blocking ring, which is journalled rotatably and concentrically to the shaft in the rose and is provided with a radial groove into which an entraining pin fixed to the toothed ring engages, and the blocking ring being furnished between the peripheral steps with an annular shoulder which is interrupted at a fixed position, corresponding to the zero setting, to permit passage of the blocking pin, and the blocking pin, provided with a rotation preventer, possesses a transverse recess for engagement with the annular shoulder.

With this proven device, it is possible, for two different movement sequences that can be carried out by the same shaft, namely optionally sliding or pivoting out/-pivoting in of the sliding lid in sliding-lifting roofs, in spite of the different setting displacements for these two movement sequences to be limited by means of this device, to provide only one indexing position, with the result that operation of the sliding roof equipped with two setting functions is considerably simplified.

With this known device, starting from the zero setting in which the blocking pin alone can be actuated, at the commencement of one of the two movement sequences, or in transition from one movement sequence to the other, for example the transition from the sliding movement after the roof has been closed into the outward pivotal movement, the blocking pin simply needs to be engaged into the path of the abutment means connected with the toothed ring in order to cancel out the rotation blocking. The blocking ring here fulfils two functions, namely on the one hand it carries the displacement-limiting abutment means and on the other hand it firmly holds with its annular shoulder the engaged blocking pin, so that the drive can be actuated in both directions of rotation. A disengagement of the blocking pin for blocking the rotational movements is possible here at only one single position, i.e. when the lid closed position has been reached. Along the entire travel of the lid closure and outward pivotal movement, the blocking pin remains engaged, so that it is not possible to block the drive and thereby the lid movement by disengaging the blocking pin in an intermediate position, for example during the opening sliding of the lid, just before the maximum opened position is reached, or during the outward pivotal movement when the lid is only half-opened. Frequently, however, it is desired to reach a specific lid setting without the need to check the opening operation by visual inspection, for example in order to maintain an accustomed roof opening, or in order to prevent air vibrations occurring at specific speeds of travel. Also, when the blocking pin is engaged and thus the rose is not blocked, the sliding lid is not secured against sudden sliding closure, for example due to inertia forces resulting from jerky stopping of the vehicle, when the lid has been slid into an intermediate position or into the maximum opened setting. Where the lid is pivoted out only partly into a ventilating position, this lid, when the blocking pin is engaged end thus the rose is not blocked, is not effectively secured against unauthorized movement of the rear edge of the lid from outside.

SUMMARY OF THE INVENTION

An object of the present invention therefore is so to construct a device of the described type that rotational blocking of the drive in intermediate positions, both of the sliding movement and also of the pivoting movement of the lid, is facilitated, and that in these intermediate positions, after the rotational blocking of the drive has been cancelled, this drive can be actuated in both directions of rotation.

According to the present invention, there is provided, a device for limiting the number of revolutions of a shaft of a rotary drive for a sliding roof of an automobile, comprising an eccentric disc secured to the shaft and having an externally toothed ring rotatably journalled upon its circumferential surface, the ring being surrounded by an internal set of teeth fixed in a rose and concentrically to the shaft axis, the tooth root radius (dedendum radius) of which external teeth is greater than the tooth crest radius (addendum radius) of the toothed ring approximately by the amount of the eccentricity of the eccentric disc, wherein abutment means for the limiting position of the shaft after predetermined numbers of revolutions have been reached are connected on the one hand to the toothed ring and on the other hand to the rose, wherein the abutment means connected to the rose is a blocking pin slidably guided parallel to the shaft, the pin being capable of engaging into or disengaging from the path of the abutment means connected to the toothed ring only in one specific setting of the toothed ring, whereby said pin permits both directions of rotation when engaged and, in its disengaged position, the drive is blocked in both directions of rotation, and wherein the abutment means connected to the toothed ring are formed as peripheral steps of a blocking ring, which is journalled rotatably and concentrically to the shaft in the rose and is provided with a radial groove into which an entraining pin fixed to the toothed ring engages, and the blocking ring being furnished between the peripheral steps with an annular shoulder which is interrupted at a fixed position, corresponding to the zero setting, to permit passage of the blocking pin, and the blocking pin, provided with a rotation preventer, possesses a transverse recess for engagement with the annular shoulder, and the annular shoulder of the blocking ring is provided, between said fixed position and at least one of the peripheral steps with at least one further gap to permit passage of the blocking pin.

The device according to this invention is distinguished especially in that, by a modification to the blocking ring of the known device while maintaining its other functions, established intermediate positions of the lid are facilitated, in which the drive is rotationally blocked and the lid is effectively secured against undesired displacement or tilting movements. This rotational blocking and securing takes place as in the Zero setting when the blocking pin is opposite a further gap in the annular shoulder of the blocking ring, so that the blocking pin can displace as a consequence of a spring force acting on it, in order to block the rotational drive.

The invention also extends to an automobile having a sliding roof incorporating a device as defined above in accordance with the invention.

BRIEF DESCRIPTION OF THE DRAWINGS

For a better understanding of the invention and to show how the same may be carried into effect, reference will now be made, by way of example, to the accompanying drawings, in which:

FIG. 1 is a vertical section through a device for limiting the number of revolutions of a shaft for a rotary drive of a sliding roof of an automobile and shows one constructed for hand crank actuation (enlarged for clarity), FIG. 2 is a section on the line II—II of FIG. 1, FIG. 3 is a partial section on the line III—III in FIG. 2, through a toothed ring and blocking ring in the region of the driving engagement, FIGS. 4 and 5 are side views of part of the blocking ring with the blocking pin disengaged and engaged respectively, FIG. 6 is a perspective view of the blocking ring, FIG. 7 shows a detent bushing in perspective, FIG. 8 also in perspective shows a spring associated with the detent bushing, FIG. 10 is a section similar to FIG. 9, but with the detent bolt pushed in.

DESCRIPTION OF PREFERRED EMBODIMENTS

Figure 6A:
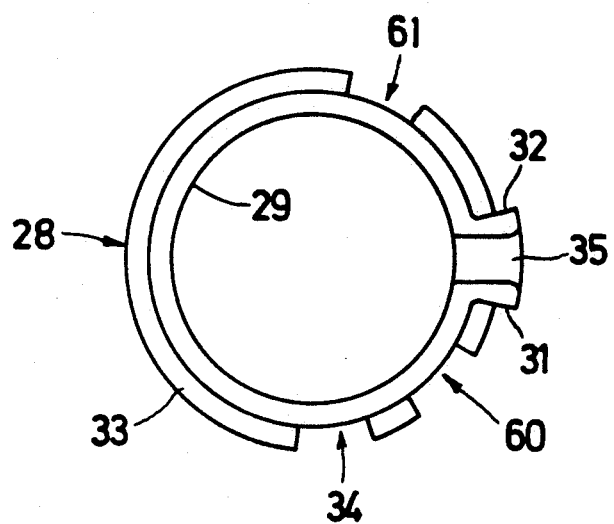
FIGS. 6a and 6b are plan views of two different forms of construction of the blocking ring.

Referring to the drawings, the shaft 1 is provided, at one end, with a serrated head 2 and, at the other end, with a drive pinion 3 torsionally keyed to it, which is brought into engagement in known manner on opposite sides with two displaceably guided threaded cables, for actuating the sliding lid. An actuating crank, pushed onto the serrated head 2 with a corresponding counterserration, is composed in the example shown of a crank base 4 and of a crank arm 5, illustrated partly cut away. The crank base 4 and crank arm 5 are connected in articulated manner by a pivot pin 6. The shaft 1, passing through a rosette block or rose 7, is rotatably journalled by zones 8 and 9 respectively in a bearing cover 10 and in a bearing ring 11, set in the rose 7.

The rose 7 is provided with through bores 12 (FIG. 2) for mounting the device on a part of the vehicle body. The bearing cover 10 is set into the rose 7 and secured, for example at its circumference, by peening. The axial securing of the drive pinion 3 is provided by a securing washer 13, engaged into a groove in the shaft.

An eccentric disc 14, fixed rigidly to the shaft 1 and preferably in one piece With it, the eccentricity e of which from the central axis of the shaft is shown in FIG. 2, journals the toothed ring 16, provided with external teeth 15, these teeth being in engagement with the rose 7 by the internal teeth 17 (FIG. 2). In the example shown, the external set of teeth 15 comprises thirty-four teeth, whereas the internal set 17 comprises thirty-six teeth.

The known method of functioning of the device so far described is as follows: when the shaft 1, and the components torsionally keyed to it, are rotated by means of the actuating crank 4, 5 in one or the other direction, the eccentric disc 14 moves the toothed ring 16, which thus rolls with its external teeth 15 in the stationary internal set of teeth 17. Since the numbers of teeth in the sets differ by two teeth, the relative position between the toothed ring 16 and the internal teeth 17 is displaced in the circumferential direction, after one revolution of the shaft 1, by the dimension of tooth divisions. The toothed ring 16 thereby rotates in opposition to the rotational direction of the shaft 1, but with an angular speed smaller by orders of magnitude. It can therefore be seen that the mounting of abutments on the toothed ring and the association of stationary abutments must result, after an accurately determinable number of rotations of the shaft 1, in blocking of the shaft and thus in limitation of revolutions, i.e. limitation of displacement of the components driven by the pinion 3.

The abutment means, which are disposed on the one hand on the rose and on the other hand on the toothed ring, are now explained. The blocking pin 19, slidably guided in its guide bushing 18, can be best seen from FIGS. 1 and 9 to 11. The guide bushing 18 is firmly fitted into a corresponding cylindrical bore of the rose 7. The annular projection 21, limiting the cylindrical bore 20 inside the guide bushing 18, guides the region 22 of the blocking pin 19 projecting out of the guide bushing 18. The end of the blocking pin 19, provided with a transverse recess 23, is guided in a bore 24 in the rose 7. A helical compression spring 25 is inserted into the annular space between the blocking pin 19 and cylinder bore 20 and bears at one end against the flange 26, fixed to the blocking pin 19 and in one piece with it, and at the other end against the rose 7. The bore 24 is continued as far as an annular channel 27, concentrically surrounding the shaft 1, into which channel the blocking pin 19 penetrates.

A blocking ring 28 is set in the annular channel, being rotatably journalled with its inner surface 29 (FIG. 6) on an annular projection 30 of the rose 7. Peripheral steps 31 and 32 (FIGS. 2, 6, 6a, 6b) form the abutment means of the blocking ring 28. An annular shoulder 33 of the blocking ring 28, extending between the steps 31 and 32, is interrupted at 34 for the passage of the blocking pin 19 in the zero setting. Further interruptions or gaps 60 and possibly also 61 (FIGS. 6a, 6b) mark intermediate positions, which will be explained in more detail below. Between the two steps 31 and 32 there is a radial groove 35, which accepts an entraining pin 36 (FIGS. 2 and 3) mounted on the toothed ring 16. As a consequence of the slit-shaped form of the radial groove 35, the entraining pin 36 can slide in the radial groove to accommodate the eccentricity e when the toothed ring 16 rotates. For securing the blocking pin 19 against rotation, which must be prevented in the light of the desired engagement between its transverse recess 23 and the annular shoulder 33, this pin is provided at its inner end with a flattened zone 37, facing towards the blocking ring 28 and bearing against the latter in all positions (FIG. 2).

FIG. 1 shows that the blocking pin 19 and the guide bushing 18, journalling it, are disposed parallel to the shaft 1 in the rose 7. The axial distance between the blocking pin 19 or its guide bushing 18 and the shaft 1 is equal to the axial distance between the detent bushing 38, set into the crank base 4, and the shaft 1. Axial parallelism also exists between the detent bushing 38 or detent bolt 39 journalled by this bushing 38, and the shaft 1. The detent bolt 39 is therefore opposite the blocking pin 19, with their axes coinciding, in one relative position of rose 7 and crank base 4.

The detent bushing, stepped down at its inner end, is seated into a corresponding stepped bore of the crank base 4 and secured there, for example by peening, as shown at 40. An inner step 41 of the detent bushing 38 terminates, with its end face, in an annular groove 42 of the crank base 4, concentrically surrounding the shaft 1. The end face of the guide bushing 18 bears against the base of the annular groove 42 when the crank base 4 is pushed with its internal serrations (not illustrated) coaxially onto the serrated head 2 of the shaft 1 and is secured there by a screw 43, having its head countersunk into the crank base 4.

In FIG. 2, the inner dot-and-dash circle indicates the position of the eccentric disc 14 relative to the shaft 1 and to the circular elements, concentric therewith, of the rose 7. A rib 59, also shown in FIG. 2, prevents rotation of the bearing ring 11, which is provided with a corresponding recess.

A central cylindrical bore 44 (FIG. 7) in the detent bushing 38 is so dimensioned that it guides the detent bolt 39 with small play but easily slidable. The detent bushing 38 has incisions 45, extending transversely to the cylindrical bore 44, which are cut to such a depth that the web 46, remaining between them, has a width smaller than the diameter of the cylindrical bore 44. In this way a detent spring, formed as clip spring 47 (FIG. 8), can penetrate with its arms 48 partly into the cylindrical bore 44 when the clip spring 47 is introduced into the incisions 45 of the detent bushing 38. Two detent depressions 49 and 50 of the detent bolt 39, formed as circumferential grooves, cooperate with the clip spring 47 in such a manner that the detent bolt can be displaced between two positions. In the at-rest position of the detent bolt 39, illustrated in FIGS. 1 and 9, the arms 48 of the clip spring 47 rest in the detent depression 50, whereas in the pushed-in position of the detent bolt (FIGS. 10 and 11), in which the detent bolt engages into a conical depression 51 of the guide bushing 18, the clip spring 47 engages with its arms 48 into the detent depression 49. As can be seen from FIGS. 1 and 9 to 11, the detent depression 50 has a transition that diverges generally conically towards the detent depression 49, which transition facilitates pushing-in of the detent bolt 39 into the crank base 4. At the outer end, a circular plate 52 is coaxially fixed to the detent pin 39, in the example shown (FIG. 1), and onto this plate a back-cut, pot-shaped actuating knob 53 is snap-engaged. An edge 54 of the actuating knob 53, facing towards the crank base 4, finds its seating in a corresponding annular groove 55 of the crank base 4, when the detent bolt 39 is pushed in.

The method of functioning of the device is explained in more detail below in the case of automobile sliding-lifting roofs. In FIG. 1, the blocking pin 19 is in its zero position. In this position, the sliding roof is closed, i.e. the sliding lid lies in the plane of the roof skin and completely closes off the roof opening. If, starting from this position, the sliding lid is to be pivoted out like a flap about its forward pivot bearing by raising its rear edge, then the rotational blocking illustrated in FIG. 1, in which the blocking pin 19 engages with its region 22 into the detent bushing 38 and prevents a rotation of the crank 4, 5, is cancelled out by pushing in the actuating knob 53. The clip spring 47 here comes out of the detent depression 50 and into the detent depression 49. The depth of the detent depression 49 and the spring force of the clip spring 47 are so designed that the detent bolt 39 remains in its pushed-in position, against the resistance of the compression spring 25, compressed by pushing in. As the detent bolt 39 is pushed in, the blocking pin 19 is displaced into the rose 7 until it adopts the position shown in FIGS. 10 and 11. In this position, on the one hand its zone 22 has come out of the detent bushing 38 and on the other hand its transverse recess 23 is in a position which facilitates engagement of the blocking ring 28 with the annular shoulder 33. As in its zero position, the blocking pin 19 in this position also is still situated in the gap 34 of the annular shoulder 33.

Figure 9:
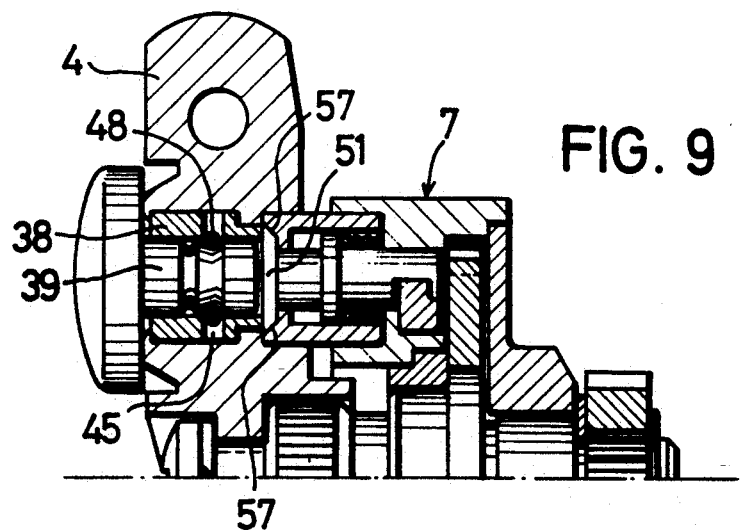
FIG. 9 is a section similar to FIG. 1, but in partial view, in which the blocking pin is situated in an engaged position, while the detent bolt is shown in its at-rest position.
Figure 10:
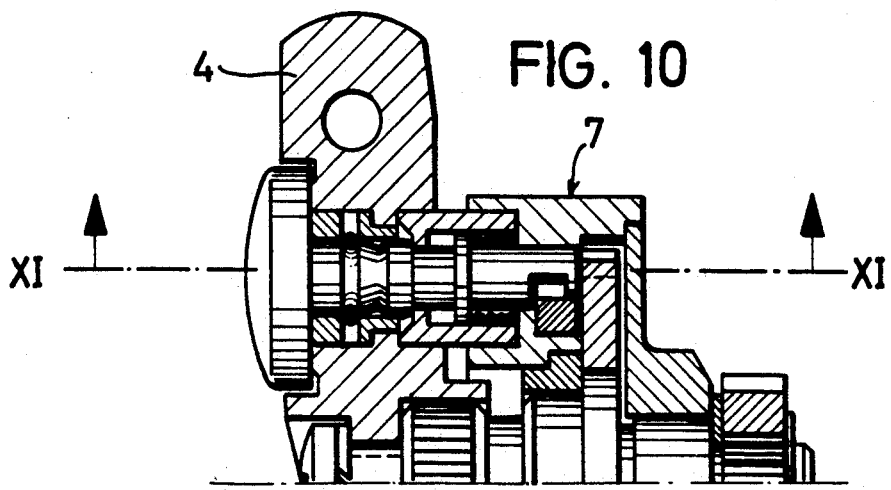

The actuating crank 4, 5 can now be rotated for actuating the sliding roof drive, that is clockwise for the desired achieving of the pivoting out movement for the sliding lid. After only a small angular rotation, the annular shoulder 33 engages into the transverse recess 23, with the result that the blocking pin 19 is held in its pushed-in position. During this initial phase of the rotational movement, the still pushed-in detent bolt 39 displaces inside the depression 51 of the guide bushing 18 until it meets, with its appropriate rounded or chamfered end face peripheral edge 56, the conically diverging inclined face 57 of the depression 51. If rotation of the actuating crank is continued, the inclined surface 57 displaces the detent bolt 39 sufficiently far for the clip spring 47 to come out of its detent depression 49 and move into the detent depression 50 and, as a consequence of the conical shape of this detent depression 50, to shift the detent bolt 39 completely into its at-rest position, as illustrated in FIG. 9.

Figure 6B:
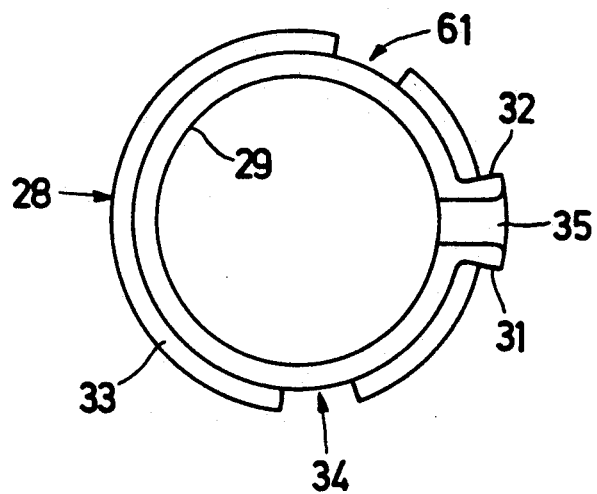

If rotation of the actuating crank in the clockwise direction is continued, the toothed ring 16, rotating by means of the eccentric disc 14 counter-clockwise, transports, by means of its entraining pin 36 and the radial groove 35, the peripheral step 31 of the blocking ring 28 until it comes into bearing with the blocking pin 19, penetrating into the movement path of the peripheral step 31, if the blocking ring 28 in accordance with its form of embodiment shown in FIG. 6b does not possess, in its annular shoulder 33, any further gap denoting an intermediate position between the gap 34 and the peripheral step 31. In this position of the abutment means, the sliding lid, driven by the pinion 3 in conjunction with operating cables (not shown), has reached its maximum pivoted-out position. If the sliding lid is now to be pivoted back into its closed position, then the reverse movement sequence takes place. The actuating crank 4, 5 is now rotated counterclockwise until the blocking ring 28 has been transported by the toothed ring 16 sufficiently far for the annular shoulder 33 to release the blocking pin 19 by its gap 34. The blocking pin 19 is now displaced outwards out of the rose 7 by the force of the helical compression spring 25 acting on it and, by engagement with its region 22 into the detent bushing 38, again blocks the actuating crank 4, 5.

If, however, the blocking ring 28 is constructed as shown in FIGS. 6 and 6a, i.e. if it possesses an additional gap or interruption 60 between the gap 34 and the peripheral step 31, then the annular shoulder 33 already releases the blocking pin 19, during the outward pivoting drive of the sliding lid, when this blocking pin is situated in this additional gap 60. The blocking pin 19, because of the force of the helical compression spring 25, is now displaced outwards out of the rose 7 and, by entry with its region 22 into the detent bushing 38, blocks the actuating crank 4, 5. The sliding lid is now situated in an intermediate pivoted-out position. If the sliding lid, starting from here, is now to be pivoted out into its maximum outward pivoted position or again pivoted back into its closed position, then the actuating knob 53 should again be pressed in, with the result that as a consequence of the already described cooperation of the components 39, 19 and 28, the rotational blocking is cancelled out for both directions of rotation. If, with the construction of the blocking ring 28 according to FIGS. 6 and 6a, the sliding lid is pivoted inwards out of its maximum pivoted-out position into its closed position or into the intermediate pivoted-out position, then rotational blocking occurs in the intermediate pivoted-out position denoted by the additional gap 60, but this rotational blocking can be easily cancelled out by simple pushing-in of the actuating knob 53, whereupon the crank 4, 5 can be further rotated in the same direction of rotation, until the closed position of the sliding lid, denoted by the gap 34, has been reached.

If the closed sliding lid is now to be displaced towards the rear, fixed vehicle roof in order to open the roof, then the actuating knob 53 must again be pushed in to cancel out the rotational blocking, whereupon the actuating crank 4, 5 can be rotated counterclockwise. The blocking ring 28 is now transported in a rotational direction which leads to an approach between its circumference step 32 and the blocking pin 19. The opening displacement of the sliding lid is completed when the peripheral step 32 meets the blocking pin 19. If, between the gap 34 and the peripheral step 32, a further gap 61 (FIGS. 6a, 6b) is provided in the annular shoulder 33, which gap marks an intermediate displacement position of the sliding lid, then before the peripheral step 32 meets the blocking pin 19 rotational blocking of the crank drive takes place, which can again be cancelled by pressing in the actuating knob 53, whereupon both directions of rotation are released for the closure displacement or further opening displacement of the sliding lid.

When closing the fully opened sliding lid, the actuating crank 4, 5 is again rotated clockwise until the annular shoulder 53 frees the blocking pin 19 at 61 in the intermediate displacement position, so that this pin returns into its position which blocks rotational movements of the crank. By simply pressing in the actuating knob 53, the rotational blocking can be cancelled in the displacement intermediate position, whereupon, depending upon the direction of rotation of the crank, either the closure displacement can be continued or the sliding lid can be displaced towards a larger roof opening. If the closure movement is continued, rotational blocking again occurs at 34, i.e. in the closed position of the lid.

Figure 11:
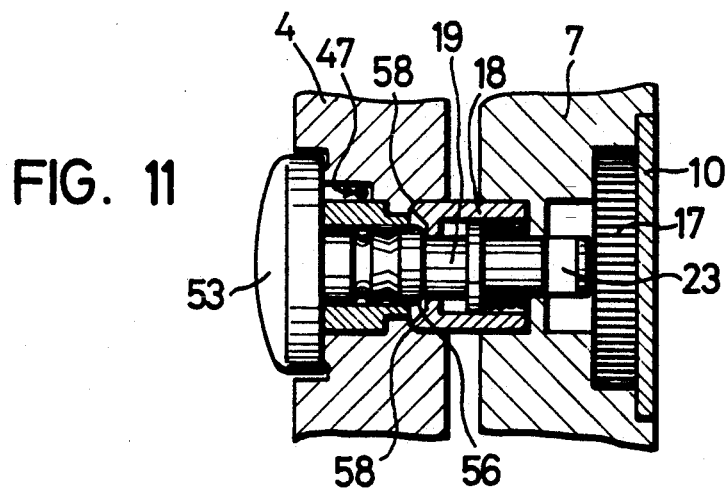
FIG. 11 is a partial section corresponding to the line XI—XI in FIG. 10.

If the actuating knob 53 should be accidentally or intentionally pressed out of its at-rest position during an outward pivoting actuation or displacement actuation of the sliding roof, then the inclined faces 58 of the guide bushing 18, shown in FIG. 11, ensure that the detent bolt 39 is again returned into its at-rest position. Faulty actuations of the actuating knob 53 therefore cannot adversely affect the desired sequence of movement.

The location chosen for the additional gap 60 or the gaps 60 and 61 on the periphery of the annular shoulder 33 of the blocking ring 28 determines the intermediate position of the lid in each case. The location shown in FIGS. 6 and 6a of the gap 60 corresponds to approximately one-half the maximum pivoted out angle of the sliding lid. The location of the gap 61 shown in FIGS. 6a and 6b marks an opening displacement of the sliding lid of approximately three-quarters the maximum opening. Other intermediate positions can, of course, be provided by further gaps along the circumference of the annular shoulder 33.

We claim:

1. A device for limiting the number of revolutions of a shaft of a rotary drive for a sliding roof of an automobile, comprising an eccentric disc secured to the shaft and having an externally toothed ring rotatably journalled upon its circumferential surface, the ring being surrounded by an internal set of teeth fixed in a rose and disposed concentrically to the shaft axis, the tooth root radius of the external teeth is greater than the tooth crest radius of the toothed ring approximately by the amount of the eccentricity of the eccentric disc, wherein abutment means for defining a limiting position of the shaft after a predetermined number of revolutions have been reached is connected to the toothed ring and to the rose, wherein the abutment means connected to the rose includes a blocking pin slidably guided parallel to the shaft, and wherein the abutment means connected to the toothed ring are formed as peripheral steps of a blocking ring, which is journalled rotatably and concentrically to the shaft in the rose and is provided with a radial groove into which an entraining pin fixed to the toothed ring engages, and the blocking ring being furnished between the peripheral steps with an annular shoulder which is interrupted at a plurality of locations in predetermined positions, one of which corresponds to a zero setting, to permit passage of the blocking pin, and the blocking pin, provided with a rotation preventer, possesses a transverse recess for engagement with the annular shoulder, and the annular shoulder of the blocking ring is provided, between said fixed position and at least one of the peripheral steps with at least one additional interruption thereof to permit passage of the blocking pin.

* * * * *